United States Patent
Ma et al.

(10) Patent No.: US 10,551,693 B2
(45) Date of Patent: Feb. 4, 2020

(54) PIXEL ELECTRODE FOR LCD PANELS, ARRAY SUBSTRATE AND DISPLAY PANEL

(71) Applicants: XIAMEN TIANMA MICRO-ELECTRONICS CO., LTD., Xiamen (CN); TIANMA MICRO-ELECTRONICS CO., LTD., Shenzhen (CN)

(72) Inventors: Yangzhao Ma, Xiamen (CN); Ling Wu, Xiamen (CN)

( * ) Notice: Subject to any disclaimer, the term of this patent is extended or adjusted under 35 U.S.C. 154(b) by 0 days.

(21) Appl. No.: 15/184,575

(22) Filed: Jun. 16, 2016

(65) Prior Publication Data

US 2017/0192283 A1    Jul. 6, 2017

(30) Foreign Application Priority Data

Dec. 31, 2015  (CN) .......................... 2015 1 1028508

(51) Int. Cl.
  *G02F 1/1343*  (2006.01)
  *G02F 1/1337*  (2006.01)
  *G02F 1/1362*  (2006.01)

(52) U.S. Cl.
  CPC .. *G02F 1/134363* (2013.01); *G02F 1/133707* (2013.01); *G02F 1/134309* (2013.01); *G02F 1/136227* (2013.01); *G02F 2201/123* (2013.01)

(58) Field of Classification Search
  CPC ......... G02F 1/134363; G02F 1/133707; G02F 1/136227; G02F 1/134309; G02F 2201/123
  See application file for complete search history.

(56) References Cited

U.S. PATENT DOCUMENTS

| | | |
|---|---|---|
| 2010/0207853 A1 | 8/2010 | Chen et al. |
| 2013/0021570 A1 | 1/2013 | Zhang |
| 2014/0118649 A1* | 5/2014 | Hirosawa .......... G02F 1/134309 349/41 |
| 2015/0055043 A1 | 2/2015 | Sakai et al. |
| 2015/0116644 A1 | 4/2015 | Morishita et al. |
| 2015/0219973 A1* | 8/2015 | Kawashima ...... G02F 1/133345 349/43 |
| 2015/0346566 A1 | 12/2015 | Nakamura et al. |

FOREIGN PATENT DOCUMENTS

| | | |
|---|---|---|
| CN | 104516159 A | 4/2015 |
| CN | 104793412 A | 7/2015 |

* cited by examiner

*Primary Examiner* — Jessica M Merlin
(74) *Attorney, Agent, or Firm* — Kilpatrick Townsend & Stockton, LLP (57) ABSTRACT

A pixel electrode is provided. The pixel electrode includes a main rod portion disposed in a first direction, a first branch portion connected with the main rod portion and extending along a second direction away from one side of the main rod portion, and a second branch portion connected with the main rod portion and extending along a third direction away from another side of the main rod portion. The first branch portion and the second branch portion does not overlap with a display region of the LCD panel, and the second branch portion is disposed at the vicinity of a via hole of the pixel electrode.

6 Claims, 11 Drawing Sheets

PIXEL ELECTRODE FOR LCD PANELS, ARRAY SUBSTRATE AND DISPLAY PANEL

CROSS-REFERENCE TO RELATED APPLICATIONS

This application is based upon and claims priority to Chinese Patent Application 201511028508.3, filed on Dec. 31, 2015, the entire contents of which are incorporated herein by reference.

TECHNICAL FIELD

The present disclosure relates to the field of display technology, and more particularly, to a pixel electrode for liquid crystal display (LCD) panels, an array substrate and a LCD panel.

BACKGROUND

Thanks to the developments of semiconductor devices and display devices, multi media technology is well developed currently. As for the display device, LCDs having advantages such as high resolution ratio, good spatial utilization, low power consumption, low radiation and the like have become mainstream of the market.

Figure 1:
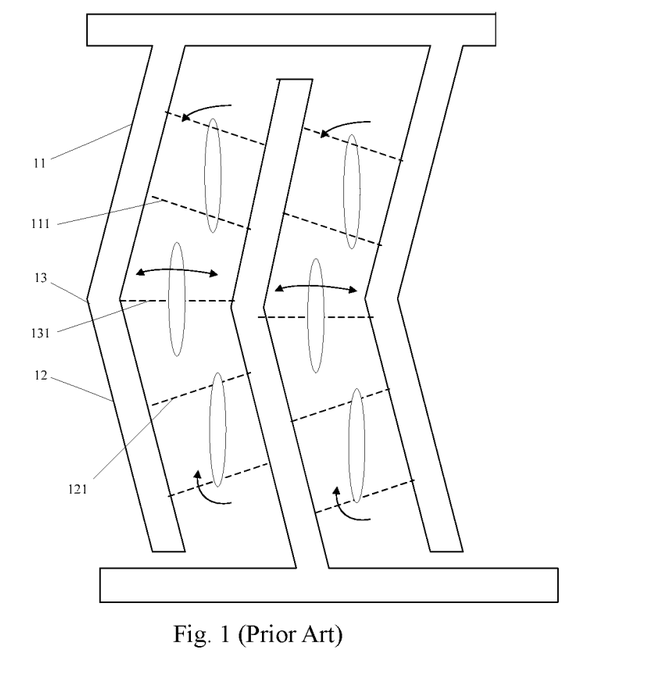
FIG. 1 is a schematic structural diagram of a pixel electrode in the prior art.

Referring to FIG. 1, the existing comb-shaped pixel electrode includes a plurality of first inclined portions 11 and a plurality of second inclined portions 12. The electrical field generated at the first inclined portion 11 is illustrated by dashed line 111 in FIG. 1, and the liquid crystal molecules herein rotates anti-clockwise due to the effect of the electrical field in the direction of the dashed line 111. The electrical field generated at the second inclined portion 12 is illustrated by dashed line 121 in FIG. 1, and the liquid crystal molecules herein rotates clockwise due to the effect of the electrical field in the direction of the dashed line 121. Liquid crystal molecules at the bent portion 13 at the connection portion of the first inclined portion 11 and the second inclined portion 12 may rotate either anti-clockwise or clockwise, which are in an unstable state under the effect of the upper and lower inclined portions. Display effect at the boundary between the upper domain and the lower domain differs from that inside the domains, particularly, after the display panel is under a pressure of, e.g., a finger, boundaries of the domains may move to leave an abnormal display, i.e., a disclination phenomenon.

Currently, display panes are developing towards a high resolution rate and an ultra-high resolution ratio, and thus more and more pixels are disposed within a unit area. In the pixel electrode according to the prior art, each pixel electrode includes at least two sawtooth-like electrodes. When more and more pixels are disposed within an unit area, space in the panel occupied by each pixel area is becoming smaller and smaller. Accordingly, using the plurality of sawtooth-like comb-shaped electrode in the prior art may have an increased processing difficulty, and is disadvantageous to the narrow bezel design of the panel. Accordingly, it is necessary to reduce the number of the sawteeth in the comb-shaped electrode, so as to realize the high resolution ratio and narrow bezel design of the display panel.

SUMMARY

The present disclosure provides a pixel electrode for a LCD panel, the pixel electrode including a main rod portion disposed in a first direction. The main rod includes a first end portion and a second end portion. A first branch portion is connected with the first end portion of the main rod portion and is extending along a second direction away from one side of the main rod portion. A second branch portion is connected with the second end portion of the main rod portion and extends along a third direction away from another side of the main rod portion. A first acute angle between the first direction and the second direction is greater than a second acute angle between the third direction and the second direction is a second acute angle, and the first acute angle is greater than the second acute angle. The present disclosure further provides another pixel electrode for a LCD panel, the pixel electrode includes a main rod portion disposed in a first direction. The main rod portion includes a first side extending along the first direction and a second side extending along the first direction. The main rod portion further includes a first end portion and a second end portion. A first branch portion is connected with the first end portion of the main rod portion and extends along a second direction away from a side of the main rod portion. A second branch portion is connected with the second end portion of the main rod portion. The second branch portion includes a first side, a second side, a third side, a fourth side and a fifth side that are connected successively. The first side of the second branch portion extends along a third direction. The second side of the second branch portion is connected with the second side of the main rod portion and extends along a fourth direction, and an angle between the first direction and the fourth direction is an acute angle.

The present disclosure further provides an array substrate for a LCD panel. the array substrate includes a first substrate and a plurality of pixel units disposed on the first substrate, and any one of the pixel units includes a pixel electrode as described above. Any one of the pixel units including a thin film transistor (TFT), wherein for any one of the pixel units, the pixel electrode is electrically connected with the TFT through a via hole.

A display panel according to the present discloser includes an array substrate as described above, including a liquid crystal display region, a second substrate disposed opposite to the array substrate; and a liquid crystal (LC) layer disposed between the array substrate and the second substrate. An overlapped region of the projections of the LC layer and the first branch portion of the pixel electrode in a direction perpendicular to the second substrate does not overlap with the liquid display region, and an overlapped region of the projections of the LC layer and the second branch portion of the pixel electrode in a direction perpendicular to the second substrate does not overlap with the liquid display region.

The liquid crystal in the LC layer of the present disclosure is a negative liquid crystal.

BRIEF DESCRIPTION OF THE DRAWINGS

FIG. 2B' is a schematic structural diagram of the pixel electrode provided in FIG. 2A excluding the first branch portion;

DETAILED DESCRIPTION

Detailed implementations of the present disclosure will be described in detail hereinafter with reference to the drawings such that the above objectives, features and advents of the present disclosure become more obvious.

Particular details are set forth in the following description for a full understanding of the present disclosure. The present disclosure, however, may be implemented in various ways different from those described herein, and those skilled in the art may make similar derivation and variations without departing from the concept of the present disclosure. Accordingly, the present disclosure is not limited to the following disclosed particular embodiments.

Figure 2A:
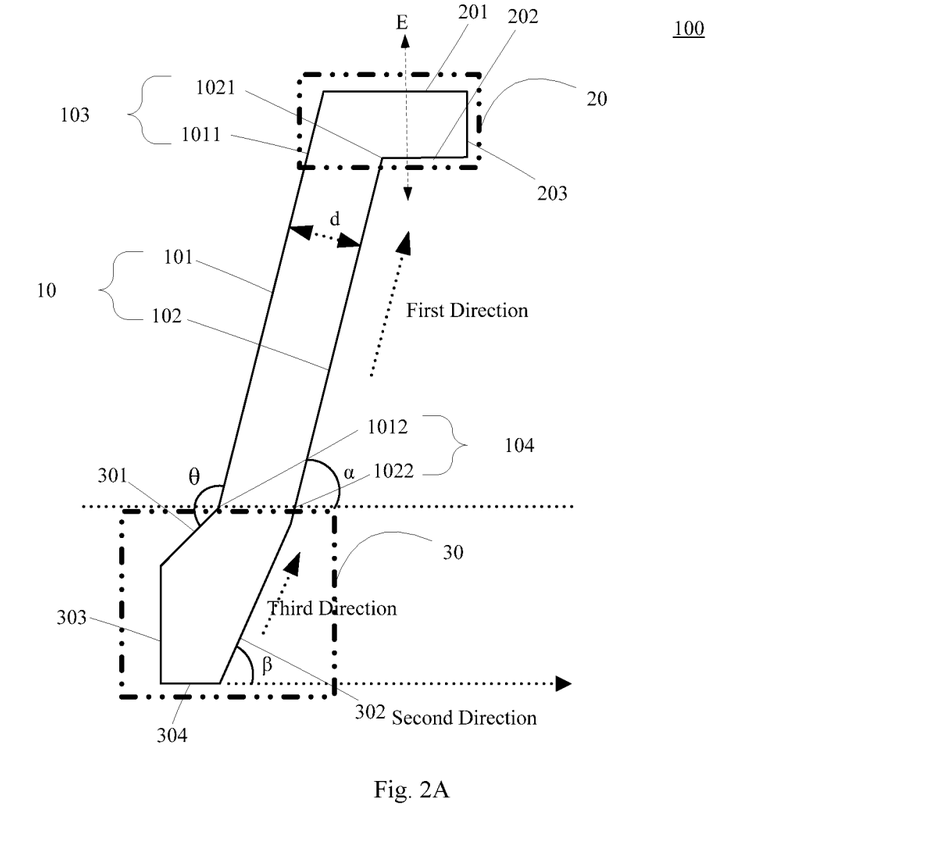
FIG. 2A is a schematic structural diagram of a pixel electrode according to an embodiment of the present disclosure.

FIG. 2A is a schematic structural diagram of a pixel electrode 100 of a LC panel according to an embodiment of the present disclosure. As illustrated in FIG. 2A, the pixel electrode 100 includes a main rod portion 10, a first branch portion 20 and a third branch portion 30.

In one embodiment, the main rod portion 10 of the pixel electrode 100 is configured along a first direction and includes a first end portion 103 and a second end portion 104. The first branch portion 20 is connected with the first end 103 of the main rod portion 10 and extends along a second direction. The second branch portion 30 is connected with the second end 104 of the main rod portion 10 and extends in a third direction. In the embodiment, a first acute angle α between the first direction and the second direction is greater than or equal to a second acute angle β between the third direction and the second direction.

In particular, the main rod portion 10 of the pixel electrode 100 includes a first side 101 and a second side 102. The first side 101 and the second side 102 are disposed in parallel, and an extension direction of the first side 101. The second side 102 is parallel to the first direction. It should be noted that, in the present embodiment, the extension direction of the main rod portion is determined by its two major sides (101 and 102), and since the first side 101 and the second side 102 of the main rod portion 10 are parallel and extending along the first direction. The extension direction of the main rod portion 10 according to the present embodiment is the first direction.

As can be seen from FIG. 2A, an acute angle is formed in the main rod portion 10 of the pixel electrode 100 between the first direction and the second direction, which is indicated by α.

In an embodiment of the present disclosure, the first branch portion 20 of the pixel electrode 100 includes a first side 201 and a second side 202, extending along the second direction. The third side 203 connecting the first side 201 and the second side 202, and the third side 203 extends along a direction perpendicular to the extension direction of the first side 201 and the second side 202.

In particular, the first side 201 of the first branch portion 20 of the pixel electrode 100 has one end connected with a first end 1011 of the first side 101 of the main rod portion 10 and the other end connected with the third side 203. The second side 202 of the first branch portion 20 has one end connected with a first end 1021 of the second side 102 of the main rod portion 10. The other end connected with the third side 203. An extension direction of the connection line is perpendicular to the second direction.

In an embodiment of the present disclosure, the second branch portion 30 of the pixel electrode 100 includes a first side 301, a second side 302, a third side 303 and a fourth side 304. In the embodiment, the second side 302 extends along the third direction. It should be noted that in the embodiments of the present disclosure, the extension direction of the second branch portion 30 is determined by the extension direction of the second side 302. That is, in this embodiment, the second side 302 extends along the third direction, and thus the second branch portion 30 extends along the third direction.

In particular, the first side 301 of the second branch portion 30 of the pixel electrode 100 has one end connected with the second end 1012 of the first side 101 of the main rod portion 10 and the other end connected with one end of the third side 303 of the second branch portion 30. The second side 302 of the second branch portion 30 has one end connected with the second end 1022 of the second side 102 of the main rod portion 10 and the other end connected with one end of the fourth side 304 of the second branch portion 30. The other end of the third side 303 of the second branch portion 30 is connected with the other end of the fourth side 304 of the second branch portion 30. It should be noted that, the third side 303 and the fourth side 304 of the second branch portion 30 are perpendicular to each other, and the fourth side 304 of the second branch portion 30 extends along the second direction.

As can be seen from FIG. 2A, the first side 301 of the second branch portion of the pixel electrode 100 forms an obtuse angle θ with the branch portion 10. An acute angle is formed in the second side 302 between the third direction and the second direction, which is indicated by β.

In some embodiments, preferably, the first acute angle α is greater than or equal to 80° and smaller than or equal to 86°, and the second acute angle β is greater than or equal to 76° and smaller than or equal to 83°. When the first acute angle α and the second acute angle β are within the above ranges, an optimal technical effect may be achieved by the embodiments of the present disclosure, i.e., maximally reduce the occurrence of the disclination regions in the LCD panel.

In one embodiment, the main rod portion 10 of the pixel electrode 100 includes the first side 101 and the second side 102 both extending in the first direction. A perpendicular distance d between the first side 101 and the second side 102 is greater than or equal to 1.5 µm and smaller than or equal to 4.5 µm. It should be noted that when the perpendicular distance d between the first side 101 and the second side 102 is greater than or equal to 1.5 µm and smaller than or equal to 4.5 µm, occurrence of the disclination regions in the LCD panel may be effectively reduced while ensuring a high resolution ratio of the LCD panel.

Figure 2B:
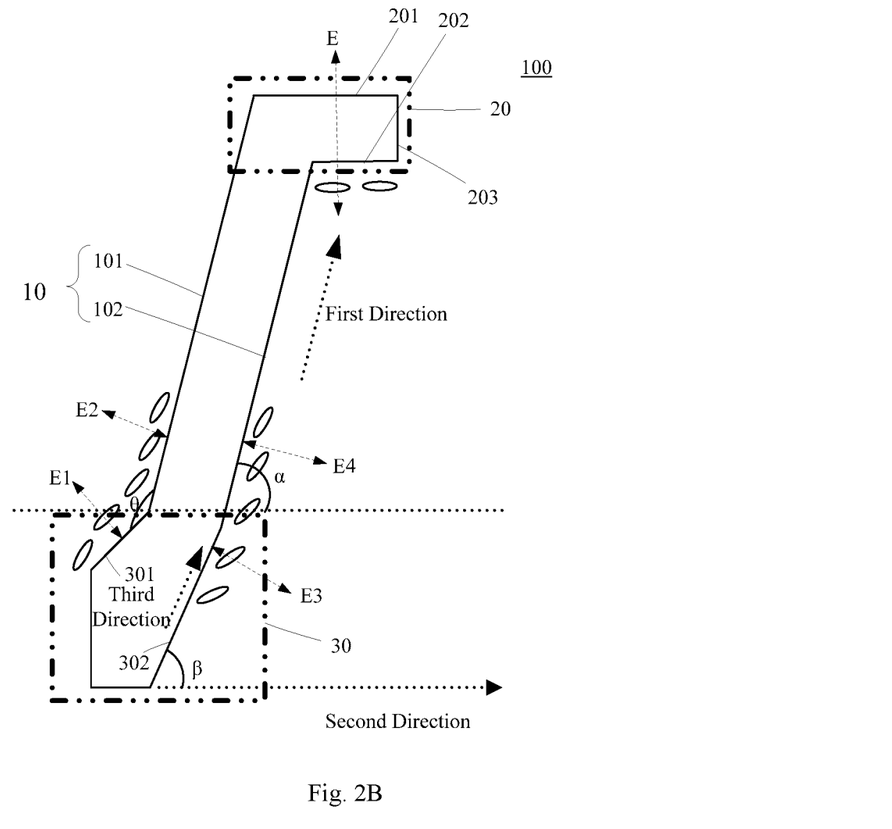
FIG. 2B is a principle view of a technical effect of the pixel electrode provided in the embodiment of FIG. 2A.

FIG. 2B is a principle view of a technical effect of the first branch portion 20 of the pixel electrode 100 provided in the embodiment shown in FIG. 2A. In order to clarify the technical effect of the first branch portion 20 of the pixel electrode 100, firstly, a display problem that occurs when the pixel electrode 100 is not provided with the first branch portion 20 is described. FIG. 2B' is a schematic diagram of the pixel electrode 100 excluding the first branch portion 20. As illustrated in FIG. 2B', when the pixel electrode 100 is not provided with the first branch portion 20, rotation of the of the liquid crystal molecules at the top end 105 of the main rod portion 10 is disordered, resulting in an uneven image on the display panel. When the first branch portion 20 is disposed at the top end 105 of the main rod portion 10 of the pixel electrode 100. Since the first branch portion 20 includes the first side 201 and the second side 202 arranged in the second direction, the direction E of the electrical field force at the first branch portion 20 are illustrated in FIG. 2B. With respect to the negative liquid crystal having a characteristic that the major axis thereof is orientated in a direction perpendicular to the electrical field force. The liquid crystal molecules will always be orientated in the second direction under the effect of the electrical field force E of the first branch portion 20. That is, the liquid crystal molecules are fixed at the first branch portion 20 under the effect of the electrical field force E, which may reduce the occurrence of the disclination phenomenon of the crystal molecules at the top end portion of the main rod portion 10.

FIG. 2B also illustrates a principle view of a technical effect of the second branch portion 30 of the pixel electrode 100 provided in the embodiment shown in FIG. 2A. As illustrated in FIG. 2B, at the angle θ formed by the first side 301 of the second branch portion 30 and the first side 101 of the main rod portion 10, the direction of the electrical field force changes from E1 to E2. As can be seen from FIG. 2B, since the angle θ is an obtuse angle, the difference between the direction of the electrical field forces E1 and E2 are small, and thus the rotation of the liquid crystal molecules at the angle θ is in a gradational transition state, as illustrated in FIG. 2B. Similarly, with respect to the connection between the second side 302 of the second branch portion 30 and the second side 102 of the main rod portion 10, since the angle α between the first direction and the second direction is greater than the angle β between the third direction and the second direction, the difference between the directions of the electrical field force E3 at the second side 302 of the second branch portion 30 and the electrical field force E4 at the second side 102 of the main rod portion 10 is reduced, resulting in that the liquid crystal molecules at the connection between the second side 302 of the second branch portion 30 and the second side 102 of the main rod portion 10 are in a gradational transition state, as illustrated in FIG. 2B, thereby preventing the phenomenon that the liquid crystal molecules at the connection between second side 302 of the second branch portion 30 and the second side 102 of the main rod portion 10 are arranged irregularly.

Figure 2C:
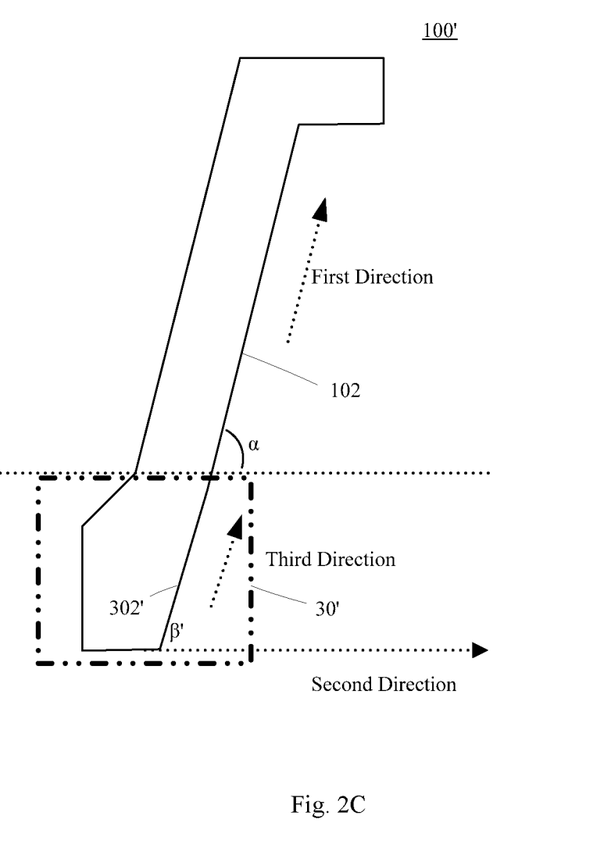
FIG. 2C is a schematic structural diagram of a pixel electrode according to another embodiment of the present disclosure.

FIG. 2C is a schematic structural diagram of a pixel electrode 100' according to another embodiment of the present disclosure. The present embodiment differs from that illustrated in FIG. 2A in that the angle α between the second side 102 of the main rod portion 10 and the second direction is equal to the angle β' between the second side 302' of the second branch portion 30' and the second direction. That is, the second side 302' of the second branch portion 30' and the second side 102 of the main rod portion 10 are in in the same line. In comparison with the pixel electrode 100 provided by the embodiment shown in FIG. 2A, the pixel electrode 100' provided by the present embodiment is advantageous in that the design difficultly and cost of the pixel electrode are reduced while maintain a certain technical effect of preventing disclination region of the LCD panel.

Figure 3:
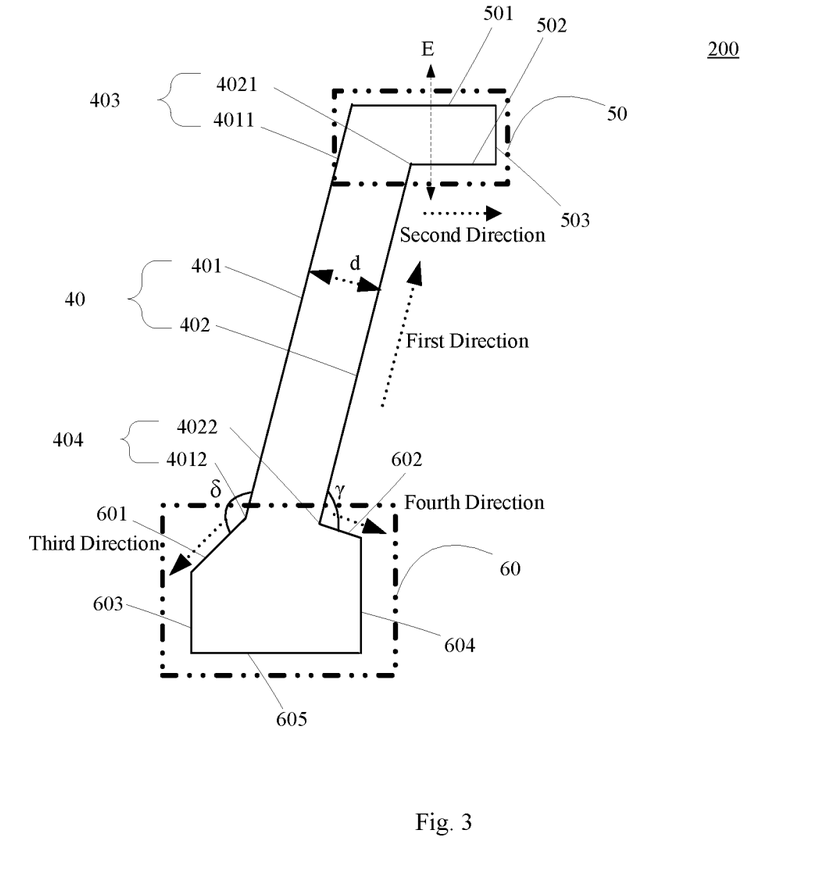
FIG. 3 is a schematic structural diagram of a pixel electrode provided in another embodiment of the present disclosure.

FIG. 3 is a schematic structural diagram of a pixel electrode 200 of the LC panel according to another embodiment of the present disclosure. As illustrated in FIG. 3, the pixel electrode 200 includes a main rod portion 40, a first branch portion 50 and a second branch portion 60.

In the embodiment, the main rod portion 40 of the pixel electrode 200 is disposed along a first direction and includes a first end portion 403 and a second end portion 404. The first branch portion 50 is connected with the first end portion 403 of the main rod portion 40 and extended along a second direction. The second branch portion 60 is connected with the second end portion 404 of the main rod portion 40 and extended in a fourth direction. In the embodiment, an angle between the first direction and the fourth direction is an acute angle γ.

In particular, the main rod portion 40 of the pixel electrode 200 includes a first side 401 and a second side 402 that are arranged in parallel, and an extension direction of the first side 401 and the second side 402 is parallel to the first direction. It should be noted that in the present embodiment, the extension direction of the main rod portion 40 is determined by its two major sides 401 and 402, and since the first side 401 and the second side 402 of the main rod portion 40 are parallel to each other and extending along the first direction, the extension direction of the main rod portion 40 according to the present embodiment is the first direction.

In one embodiment, the first branch portion 50 of the pixel electrode 200 includes a first side 501 and a second side 502 extending along the second direction and a third side 503 connecting the first side 501 and the second side 502, and the third side 503 is perpendicular to the first side 501 and the second side 502.

In particular, the first side 501 of the first branch portion 50 of the pixel electrode 200 has one end connected with a first end 4011 of the first side 401 of the main rod portion 40 and the other end connected with the third side 503, and the second side 502 of the first branch portion 50 has one end connected with a first end of the second side 402 of the main rod portion 40 and the other end connected with the third side 503. The third side 503 extends in a direction perpendicular to the second direction.

In an optional embodiment of the present disclosure, the second branch portion 60 of the pixel electrode 200 includes a first side 601, a second side 602, a third side 603, a fourth side 604 and a fifth side 605. In one embodiment, the first side 601 extends in the third direction, and the second side 602 extends in the fourth direction. It should be noted that in the embodiment of the present disclosure, the extension direction of the second branch portion 60 of the pixel electrode 200 is defined by the extension direction of the second side 602. That is, in the optional embodiment of the present direction, the second side 602 extends in the fourth direction, and thus the second branch portion 60 extends in the fourth direction.

In particular, the first side 601 of the second branch portion 60 of the pixel electrode 200 has one end connected with a second end 4012 of the first side 401 of the main rod portion 40 and the other end connected with one end of the third side 603 of the second branch portion 60, the second side 602 of the second branch portion 60 has one end connected with a second end 4022 of the second side 402 of the main rod portion 40 and the other end connected with one end of the fourth side 604 of the second branch portion

60. The other end of the second side 603 of the second branch portion 60 and the other end of the fourth side 604 of the second branch portion 60 are connected with the fifth side 605 of the second branch portion 60. It should be noted that the third side 603 and the fourth side 604 of the second branch portion are parallel to one another and perpendicular to the fifth side 605, and the fifth side 605 of the second branch portion extends along the second direction.

As can be seen from FIG. 3, an angle formed between the second side 602 of the second branch 60 of the pixel electrode 200 and the second side 402 of the main rod portion 40 is an acute angle, which is denoted by γ.

It should be noted that, in the embodiments of the present disclosure, an obtuse angle δ is formed between the first side 601 of the second branch portion 60 of the pixel electrode 200 and the first side 401 of the main rod portion 40, such that a difference between the direction of the electrical field force at the first side 601 of the second branch portion 60 and that at the first side 401 of the main rod portion 40 is reduced, thereby avoiding the phenomenon that the liquid crystal molecules at the connection between the first side 601 of the second branch portion 60 of the pixel electrode 200 and that at the first side 401 of the main rod portion 40 are arranged irregularly.

In an optional embodiment of the present disclosure, an angle γ formed between the second side 602 of the second branch portion 60 of the pixel electrode 200 and the second side 402 of the main rod portion 40 is preferably greater than or equal to 30° and smaller than or equal to 45°. When the angle γ formed between the second side 602 of the second branch portion 60 of the pixel electrode 200 and the second side 402 of the main rod portion 40 is preferably greater than or equal to 30° and smaller than or equal to 45°, the technical effect of preventing the occurrence of disclination the of the pixel electrode 200 is optimized.

In an optional embodiment of the present disclosure, a perpendicular distance d between the first side 401 and the second side 402 of the main rod portion 40 of the pixel electrode 200 is greater than or equal to 1.5 μm and smaller than or equal to 4.5 μm. When the perpendicular distance d between the first side 401 and the second side 402 of the main rod portion 40 of the pixel electrode 200 is greater than or equal to 1.5 μm and smaller than or equal to 4.5 μm, it is favorable to a high regulation ratio design of the display panel while preventing the occurrence of the disclination problem.

Figure 3A:
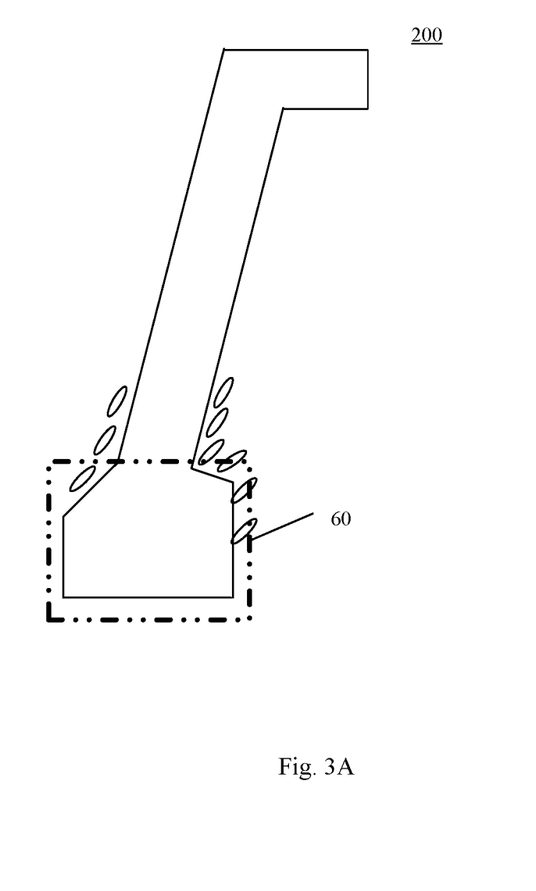
FIG. 3A is a principle view of a technical effect of the pixel electrode provided in the embodiment of FIG. 3.

The embodiment illustrated in FIG. 3 differs from those illustrated in FIGS. 2A and 2C in that, the second branch portion 60 includes at least five sides, the angle γ between the second side 602 of the second branch portion 60 and the second side 402 of the main rod portion 40 is an acute angle, and the second side 602 of the second branch portion 60 is required to be connected to the bottom side 605 through the fourth side 604 perpendicular to the second direction. That is, in the present embodiment, since the angle γ between the second side 602 of the second branch portion 60 and the second side 402 of the main rod portion 40 is an acute angle, the fourth side 604 of the second branch portion 60 in the present disclosure is necessary in this embodiment such that rotation of the liquid crystal molecules at this angle is in a gradational transition state. Such a design is advantageous in that the disclination at the connection between the second branch portion and the main rod portion may be effectively prevented by the second side 602 and the fourth side 604 of the second branch portion. As illustrated in FIG. 3A, a principle view of a technical effect of the pixel electrode provided in the embodiment of the present disclosure is illustrated, which is similar to that involved in FIG. 2A and thus will not be repeated herein.

It should be noted that all the liquid crystal molecules in the embodiments of the present disclosure are negative liquid crystals. However, the technical principle involved in the embodiments of the present disclosure is not limited to negative liquid crystals. With respect to a positive liquid crystal, those skilled in the art may obtain a corresponding technical effect by slight variations under the inspiration of the embodiments of the present disclosure.

Accordingly, according to the present disclosure, by providing the first branch portion and the second branch portion in addition to the main rod portion, the pixel electrode may effectively prevent the disclination and reduce the unstable phenomenon of the displayed imaged of the LCD panel using the above pixel electrode structure.

Figure 4:
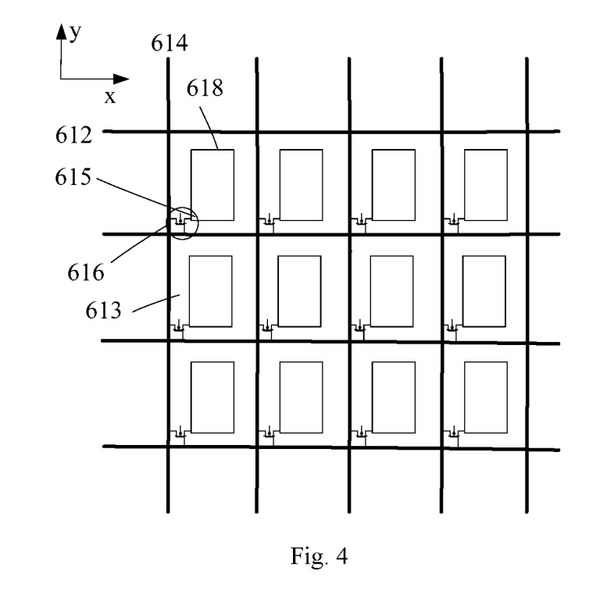
FIG. 4 is a schematic structural diagram of an array substrate provided in an embodiment of the present disclosure.

Embodiments further provide an array substrate as illustrated in FIG. 4, the array substrate includes a plurality of scan lines 612 extending along an x direction, a plurality of data lines 614 extending along a y direction, and a plurality of pixel units 613 surrounded by the scan lines 612 and the data lines 613. Each pixel unit 613 includes a pixel electrode 618. The pixel electrode 618 in each pixel unit 613 is electrically connected with a TFT 616. In one embodiment, the pixel electrode 618 may utilize a structure of the pixel electrode disclosed in embodiments corresponding to FIG. 2A, FIG. 2B, and FIG. 3.

It should be noted that, in comparison to the prior art as illustrated in FIG. 1, the structure of the pixel electrode 618 in each pixel unit in the present embodiment includes only one sawtooth. That is, the pixel electrode 618 controlling the display of one pixel unit according to the present embodiment does not require the comb-shaped structure having a plurality of sawteeth, thereby lowering the process difficulty and meanwhile is advantageous to the narrow bezel design of the panel in a design of a high resolution ratio display panel.

Figure 5:
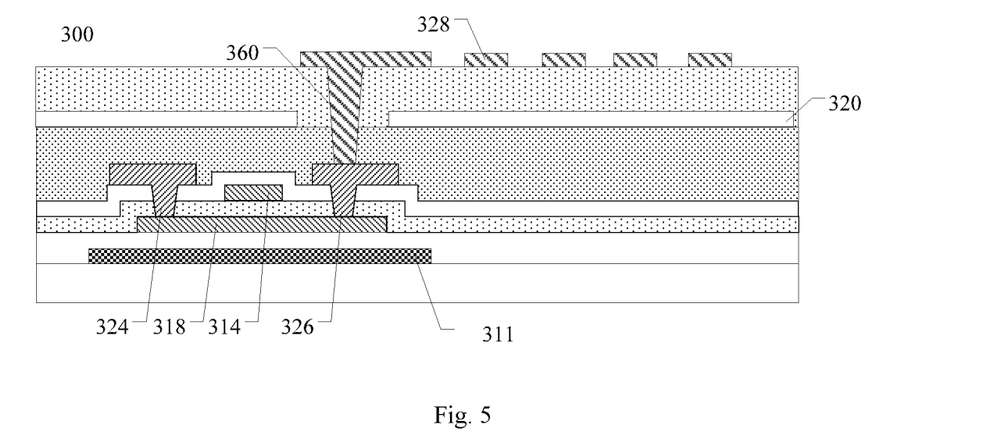
FIG. 5 is a schematic cross sectional view of an array substrate provided in an embodiment of the present disclosure.

FIG. 5 is a schematic cross sectional view of an array substrate provided in an embodiment of the present disclosure. Referring to FIG. 5, the array substrate 300 includes a light blocking layer 311, a low temperature poly-silicon layer 318, a gate electrode 314 of a TFT, a source electrode 324 of the TFT, a drain electrode 326 of the TFT, a common electrode layer 320, a pixel electrode layer 328 and a via hole 360. In one embodiment, the pixel electrode layer 328 is electrically connected with the drain electrode 326 of the TFT through the via hole 360. It may be appreciated that the direction of the electric field force at the via hole is not unitary, causing that the rotation of the liquid crystal is in a very uncertain state, which may lead to disclination.

Figure 6:
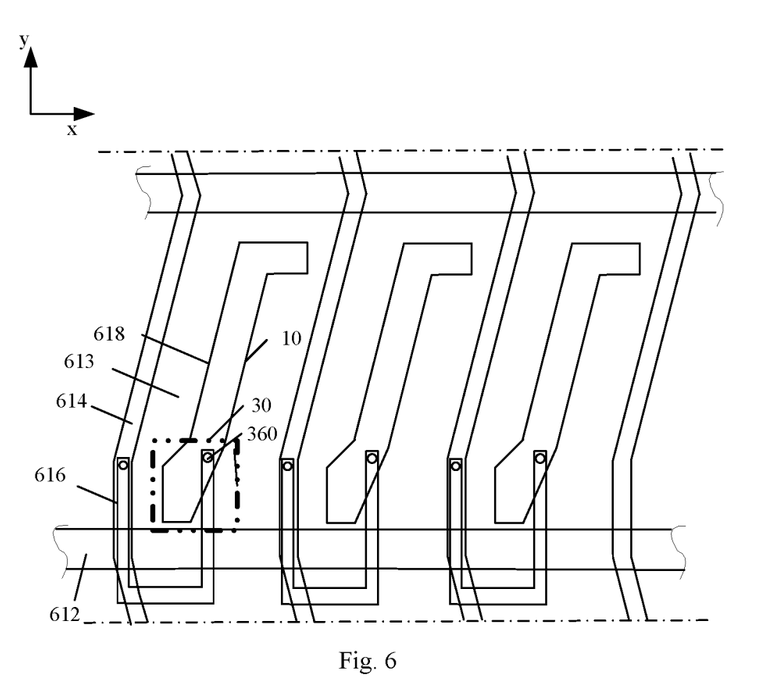
FIG. 6 is a top view of a pixel unit of an array substrate provided in an embodiment of the present disclosure.

FIG. 6 is schematic diagram of an array substrate using the pixel electrode 100 illustrated in FIG. 2A. As illustrated in FIG. 6, the array substrate includes a pixel electrode 100 illustrated in FIG. 2A which dispose its second branch portion 30 at the via hole 320, at the vicinity of the position where the first acute angle α is formed. Since the second branch portion 30 extends along the third direction, and the angle α between the first direction and the second direction is greater than the angle β between the third direction and the second direction, the second branch portion 30 is bent towards the side away from the first branch portion 20 with respect to the main rod portion 10. That is, the second branch portion 30 is inclined towards a direction closer to the TFT 616. In the pixel unit 613, since the direction of the electric field force at the via hole 360 is not unitary, the rotation directions of the liquid crystal molecules are different from one another and may cause disclination. This can be disadvantageous to the stability of the displayed image. In the embodiments of the present disclosure, however, by disposing the second branch portion 30 at the vicinity of the via hole 360 and bending the second branch portion 30 from the main rod portion 10 towards a side away from the first branch portion 50, the pixel electrode 100 may reduce the difference between the directions of the electrical field forces at the vicinity of the via hole 360, as illustrated in FIG. 2B. Accordingly, the liquid crystal molecules are stabilized along the direction of the gradational changed electrical field force under the effect of the gradational changed electrical field force. Accordingly, disordered arrangement of the liquid crystal molecules and thus the disclination phenomenon may be prevented.

Figure 7:
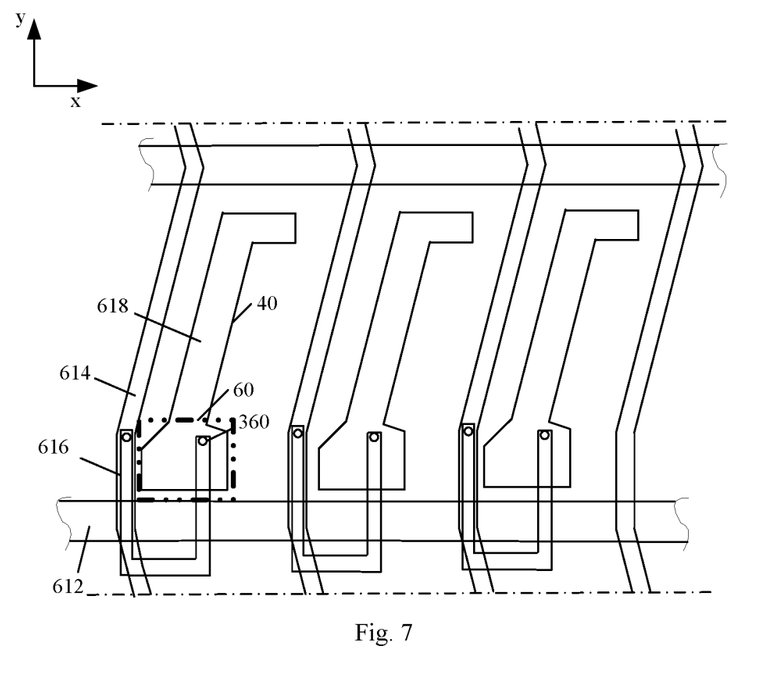
FIG. 7 is a top view of a pixel unit of an array substrate provided in another embodiment of the present disclosure.

FIG. 7 is a schematic diagram of an array substrate using the pixel 200 illustrated in FIG. 3. As illustrated in FIG. 7, the array substrate includes the pixel electrode 200 illustrated in FIG. 3 which disposes the vial hole 360 at a right side connection portion of the main rod portion 40 and the second branch portion 60, at the vicinity of the position where the acute angle γ is formed (as illustrated in FIG. 3). Similarly, the arrangement of the second branch portion 60 may effectively prevent the disclination regions occurred at the via hole 360, the technical principle thereof will not be repeated herein.

It should be noted that embodiments of the present disclosure is not limited to the top gate structure illustrated in FIG. 5, but also may include a bottom gate structure, which is not limited in the present disclosure. The material forming the gate electrode 314, the source electrode 324 and the drain electrode 326 of the TFT in the array substrate 300 illustrated in FIG. 5 may be one of aluminum, chromium, aluminum alloy, chromium alloy and the combination thereof, or may be other suitable conductive material. The material forming the pixel electrode 328 and the common electrode 320 may be one of indium tin oxide (ITO), indium zinc oxide (IZO) and the combination of thereof, or may be other suitable material.

Accordingly, in the embodiments of the present disclosure, the pixel array and display panel include pixel electrodes having particular structure, which may reduce the uncertainty of the tiled direction of the liquid crystal at the edge of the pixel electrode and the via hole, thereby reduce the occurrence of the disclination at the edge of the pixel electrode and the via hole. Accordingly, disclination regions displayed on the LC panel using the above pixel electrode structure may be reduced and display effect may be improved. Meanwhile, it is unnecessary to design each pixel electrode into a comb-shaped electrode having a plurality of sawteeth, which is advantageous to the high resolution ratio and narrow bezel design of the display panel.

Exemplary implementations of the present disclosure are illustrated and described above in detail. It should be appreciated that the present disclosure is not limited to the disclosed implementations, rather, the present disclosure intents to include various modifications and equivalent substitutions within the scope of the claims.

What is claimed is:

1. An array substrate for a LCD panel, the array substrate comprising a first substrate and a plurality of pixel units disposed on the first substrate, and any one of the pixel units comprising a pixel electrode, the pixel electrode comprising:
   a main rod portion disposed linearly along the first direction, the main rod comprising a first end portion and a second end portion;
   a first branch portion connected directly with the first end portion of the main rod portion, the first branch extending along a second direction away from one side of the main rod portion; and
   a second branch portion comprising a bend portion at which the second branch portion is connected directly with the second end portion of the main rod portion, the second branch portion extending along a third direction away from another side of the main rod portion, wherein
   a first acute angle between the first direction and the second direction is greater than a second acute angle between the third direction and the second direction, and
   wherein any one of the pixel units comprising a thin film transistor (TFT), wherein for any one of the pixel units, the pixel electrode is electrically connected with the TFT through a via hole, and wherein the via hole is disposed at the bend portion, and
   wherein each pixel unit comprises one pixel electrode comprising one main rod portion, one first branch portion and one second branch portion,
   wherein the first branch portion comprises a first side extending along the second direction and a second side extending along the second direction,
   a first end of the first side of the first branch portion is directly connected with a first end of a first side of the main rod portion,
   a first end of the second side of the first branch portion is directly connected with a first end of a second side of the main rod portion,
   an extension direction of a connection line connecting a second end of the first side of the first branch portion and a second end of the second side of the first branch portion is perpendicular to the second direction to form a free end of the first branch portion, and
   wherein the second branch portion comprises a first side, a second side, a third side and a fourth side, wherein
   a first end of the first side of the second branch portion is directly connected with a second end of the first side of the main rod portion,
   a first end of the second side of the second branch portion is directly connected with the second end of the second side of the main rod portion,
   a first end of the third side of the second branch portion is directly connected with a second end of the first side of the second branch portion,
   a first end of the fourth side of the second branch portion is directly connected with a second end of the second side of the second branch portion,
   a second end of the third side of the second branch portion is directly connected with a second end of the fourth side of the second branch portion to form a free end of the second branch portion,
   the fourth side of the second branch portion is parallel to the first side of the first branch portion,
   the third side of the second branch portion is directly connected with the fourth side of the second branch portion, and
   an extension direction of a connection line connecting the third side of the second branch portion and the fourth side of the second branch portion is perpendicular to the second direction.

2. The array substrate according to claim 1, wherein the first acute angle is greater than or equal to 80° and smaller than or equal to 86°, and the second cute angle is greater than or equal to 76° and smaller than or equal to 83°.

3. The array substrate according to claim 1, wherein the main rod portion comprises a first side extending along the first direction and a second side extending along the first direction, and a perpendicular distance between the first side and the second side is greater than or equal to 1.5 μm and smaller than or equal to 4.5 μm.

4. The array substrate according to claim 1, wherein the second side of the second branch portion extends along the third direction and an angle between the second side of the second branch portion and the second direction is the second acute angle.

5. A display panel comprising:
- an array substrate according to claim 1, comprising a liquid crystal display region;
- a second substrate disposed opposite to the array substrate; and
- a liquid crystal (LC) layer disposed between the array substrate and the second substrate,
- wherein, an overlapped region of the projections of the LC layer and the first branch portion of the pixel electrode in a direction perpendicular to the second substrate does not overlap with the liquid display region, and an overlapped region of the projections of the LC layer and the second branch portion of the pixel electrode in a direction perpendicular to the second substrate does not overlap with the liquid display region.

6. The display panel according to claim 5, wherein the liquid crystal in the LC layer of the present disclosure is a negative liquid crystal.

* * * * *